United States Patent
Bertens et al.

(10) Patent No.: US 8,290,292 B2
(45) Date of Patent: Oct. 16, 2012

(54) METHOD OF GENERATING A MULTISCALE CONTRAST ENHANCED IMAGE

(75) Inventors: Tom Bertens, Perk (BE); Pieter Vuylsteke, Mortsel (BE)

(73) Assignee: Agfa HealthCare N.V., Mortsel (BE)

(*) Notice: Subject to any disclaimer, the term of this patent is extended or adjusted under 35 U.S.C. 154(b) by 376 days.

(21) Appl. No.: 12/669,547

(22) PCT Filed: Jun. 10, 2008

(86) PCT No.: PCT/EP2008/057213
§ 371 (c)(1), (2), (4) Date: Jan. 27, 2010

(87) PCT Pub. No.: WO2009/013057
PCT Pub. Date: Jan. 29, 2009

(65) Prior Publication Data
US 2010/0195886 A1      Aug. 5, 2010

(30) Foreign Application Priority Data
Jul. 20, 2007   (EP) .................................... 07112825

(51) Int. Cl.
*G06K 9/40* (2006.01)

(52) U.S. Cl. ........ 382/254; 382/255; 382/263; 382/264; 382/274; 382/275

(58) Field of Classification Search .................. 382/100, 382/130, 131, 132, 162, 166, 254, 260, 263, 382/274, 275, 284, 298
See application file for complete search history.

(56) References Cited

U.S. PATENT DOCUMENTS

| | | | |
|---|---|---|---|
| 5,799,100 A * | 8/1998 | Clarke et al. .................. | 382/132 |
| 6,285,798 B1 * | 9/2001 | Lee .............................. | 382/260 |
| 6,310,967 B1 * | 10/2001 | Heine et al. ................... | 382/128 |
| 6,593,941 B1 * | 7/2003 | Sameshima ................... | 715/716 |
| 7,426,312 B2 * | 9/2008 | Dance et al. .................. | 382/254 |
| 2005/0089239 A1 * | 4/2005 | Brajovic ....................... | 382/266 |

FOREIGN PATENT DOCUMENTS

EP       0 527 525 A2      2/1993

(Continued)

OTHER PUBLICATIONS

Kunz, D., et al, "Nonlinear multiresolution gradient adaptive filter for medical images," Proceedings of the SPIE, SPIE, Bellingham, VA, US, vol. 5032, 2003, pp. 732-742.

(Continued)

*Primary Examiner* — Brian Le
(74) *Attorney, Agent, or Firm* — Houston & Associates, LLP

(57) ABSTRACT

At least one approximation image is created of the image at one or multiple scales. Translation difference images are created by pixel-wise subtracting the values of an approximation image at scale s and the values of a translated version of the approximation image. A non-linear modification is applied to the values of the translation difference image (s) and at least one enhanced center difference image at a specific scale is computed by combining the modified translation difference images at that scale or a smaller scale with weights $w_{i,j}$. An enhanced image is computed by applying a reconstruction algorithm to the enhanced center difference images. The non-linear modification of the values of the translation difference images is steered by (a) characteristic (s) computed out of the approximation image (s) at least one scale.

20 Claims, 7 Drawing Sheets

FOREIGN PATENT DOCUMENTS

| | | |
|---|---|---|
| EP | 1 001 370 A1 | 5/2000 |
| EP | 1 020 816 A1 | 7/2000 |
| EP | 1 094 419 A1 | 4/2001 |

OTHER PUBLICATIONS

Mallat, S.G., "A Theory for Multiresolultion Signal Decomposition: The Wavelet Representation," IEEE Trans. On Pattern Analysis and Machine Intelligence, vol. 11, No. 7, Jul. 1989.

European Patent Application No. 06 125 766.3 filed Dec. 11, 2006.

International Search Report, mailed Dec. 12, 2008, from International Application No. PCT/EP2008/057213, filed on Jun. 10, 2008.

International Preliminary Report on Patentability, dated Jan. 26, 2010, from International Application No. PCT/EP2008/057213, filed on Jun. 10, 2008.

* cited by examiner $$LUT_k(d,B_g(g_k),A_k(g_k,\uparrow(g_{k+1}))) = f_k(d,B_g(g_k),A_k(g_k,\uparrow(g_{k+1})))$$

$f_k(d,B_g(g_k),A_k(g_k,\uparrow(g_{k+1})))$ is the amplification of local contrast $d$ at scale $k$ $LUT_k(d,B_g(g_0),A_k(g_0)) = f_k(d,B_g(g_0),A_k(g_0))$ $f_k(d,B_g(g_0),A_k(g_0))$ is the amplification of local contrast $d$ at scale $k$ $LUT_k(d,B_g(g_{k-m}),A_{k-m}(g_{k-m},\uparrow(g_{k+1-m}))) = f_k(d,B_g(g_{k-m}),A_{k-m}(g_{k-m},\uparrow(g_{k+1-m})))$ $f_k(d,B_g(g_{k-m}),A_{k-m}(g_{k-m},\uparrow(g_{k+1-m})))$ is the amplification of local contrast $d$ at scale $k$

Legenda

| Symbol | |
|---|---|
| $g_k$ | Approximation image at scale k |
| $d_k$ | Detail image at scale k |
| $h_k$ | Contrast enhanced approximation at scale k |
| (Lv) | Low-pass filtering of input image, followed by subsampling. |
| (v^m) | Subsampling m consecutive times |
| (^) | Upsampling |
| (+) | Addition |
| (×) | Multiplication |
| (Σ) | Summation |
| (÷) | Division |
| (▦) | Moving neighborhood operator (used to compute the translation differences) |
| (×$w_i$) | Weighing operator |
| LUT | Conversion operator |
| ($A_g$) | Optional transform applied to the approximation images to obtain useful steering characteristics |
| ($C_k$) | Optional transform applied to the detail images to obtain useful steering characteristics |
| ($B_g$) | Optional adaptive filter applied to the approximation images |
| ($K_d$) | Optional adaptive filter applied to the enhanced detail images |
| ($L_d$) | Optional transform applied to the enhanced detail images (e.g. normalization) |
| (B) | Optional transform of the residual image. |

FIG. 7

METHOD OF GENERATING A MULTISCALE CONTRAST ENHANCED IMAGE

FIELD OF THE INVENTION

The present invention relates to a method for enhancing the image quality of an image that is represented by a digital signal.

BACKGROUND OF THE INVENTION

Commonly images represented by a digital signal such as medical images are subjected to image processing during or prior to displaying or hard copy recording.

The conversion of grey value pixels into values suitable for reproduction or displaying may comprise a multi-scale image processing method (also called multi-resolution image processing method) by means of which the contrast of the image is enhanced.

According to such a multi-scale image processing method an image, represented by an array of pixel values, is processed by applying the following steps. First the original image is decomposed into a sequence of detail images at multiple scales and occasionally a residual image. Next, the pixel values of the detail images are modified by applying to these pixel values at least one conversion. Finally, a processed image is computed by applying a reconstruction algorithm to the residual image and the modified detail images.

There are limits for the behavior of the conversion functions. Grey value transitions in the image can be distorted to an extent that the appearance becomes unnatural if the conversion functions are excessively non-linear. The distortions are more pronounced in the vicinity of significant grey level transitions, which may result in overshoots at step edges and loss of homogeneity in regions of low variance facing strong step edges. The risk of creating artifacts becomes more significant for CT images since they have sharper grey level transitions, e.g. at the interface of soft tissue and contrast media. One has to be careful using the multi-scale techniques on CT images.

A multi-scale contrast enhancement algorithm which results in a contrast enhanced image while preserving the shape of the edge transitions has been described in co-pending European patent application 06 125 766.3 filed Dec. 11, 2006.

In one embodiment of this method translation difference images of at least one approximation image of the image are created at one or multiple scales. Next, translation difference images are non linearly modified. Then at least one enhanced center difference is image at a specific scale is computed by combining modified translation difference images at that scale or at a smaller scale. Finally an enhanced image is computed by applying a reconstruction algorithm to the enhanced center difference images.

It is an object of the present invention to further enhance this method.

SUMMARY OF THE INVENTION

The above-mentioned further enhancement is obtained by a method having the specific steps set out in claim 1. Specific elements for preferred embodiments of the invention are set out in the dependent claims.

In the context of the present invention specific terms are defined as follows:

Multi-scale Decomposition Mechanism:

A multi-scale (or multi-resolution) decomposition of an image is a process that computes detail images of said image at multiple scales of a grey value image. A multi-scale decomposition mechanism generally involves filter banks for computing the detail images. Well-known techniques are for example: the Laplacian pyramid, the Burt pyramid, the Laplacian stack, the wavelet decomposition, QMF filter banks.

Approximation Image:

An approximation image is a grey value image that represents the original grey value image at the same or a larger scale, or at the same or a lower resolution. An approximation image at a specific scale is equivalent to the original grey value image in which all details at that scale have been omitted (Mallat S. G., "A Theory for Multiresolution Signal Decomposition: The Wavelet Representation", IEEE Trans. On Pattern Analysis and Machine Intelligence, vol. 11, no. 7, Jul. 1989).

Detail Image:

A detail image is defined as the difference of information between an approximation image at a certain scale and an approximation image at a smaller scale.

Conversion Operator:

A conversion operator is an operator which generates the pixel-wise modification of the detail pixel values as an intermediate step to create a contrast enhanced version of the grey value image. Such an operator has for example been described in European patent EP 527 525. The modification is defined by a conversion function and can e.g. be implemented as a look up table or as a multiplicative amplification.

Translation Difference Image:

The translation difference images at a scale s are a measurement of elementary contrast in each pixel of an approximation image at scale s. They can be computed by taking the difference of the approximation image at that scale s and a translated version. Other computations for elementary contrast are possible, e.g. the ratio of pixel with a neighboring pixel can be used in case the processing steps are preceded by an exponential transform and followed by a log transform.

Center Difference Image:

A center difference image is computed by applying a combining operator (for example the summation) to translation difference images.

The combining operator can be a linear or non-linear function of corresponding pixel values in the translation difference images.

The prior art method is enhanced by steering the non-linear modification of the values of the translation difference images by one or more characteristics that are computed out of the approximation images at least one scale.

Examples of these characteristics that are described further on are the average grey value in an area, the local standard deviation etc.

Another example is the presence of predefined image structures or abnormal patterns in an approximation image. An example of such a pattern is a microcalcification in a mammographic image.

The detection of these abnormal patterns can be performed by several techniques reaching from simple filtering to a complex computer aided detection algorithm. For example by means of a binary localization mask the presence of these abnormal patterns can be used to steer the non-linear modification.

In one embodiment the approximation image mentioned in claim 1 is filtered before translation difference image are combined out of it. Filtering can be based on the characteristics of the approximation images and/or a detail image at the same or a coarser scale.

Gain adjustment can be obtained by filtering enhanced center difference images. Filtering may be based on the characteristics of an approximation image or a detail image.

Furthermore the enhanced center difference images can be subjected to a pixel-wise transformation such as a normalization of amplitudes of the enhanced multi-scale representation.

Different embodiments are described in which translation difference images are computed out of approximation images at the same scale, out of the original image or out of a combination of approximation images at different scales.

The present invention is generally implemented as a computer program product adapted to carry out the method of any of the claims when run on a computer and is stored on a computer readable medium.

The methods of the present invention can be applied for enhancing the image quality of medical images such as mammographic images, images obtained by computed tomography etc.

Further advantages and implementations of the embodiments of the present invention will be explained in the following description and will be illustrated by the drawings.

BRIEF DESCRIPTION OF THE DRAWINGS

FIG. 7 is a legend pertaining to the symbols used in the above figures.

DETAILED DESCRIPTION OF THE INVENTION

Figure 1:
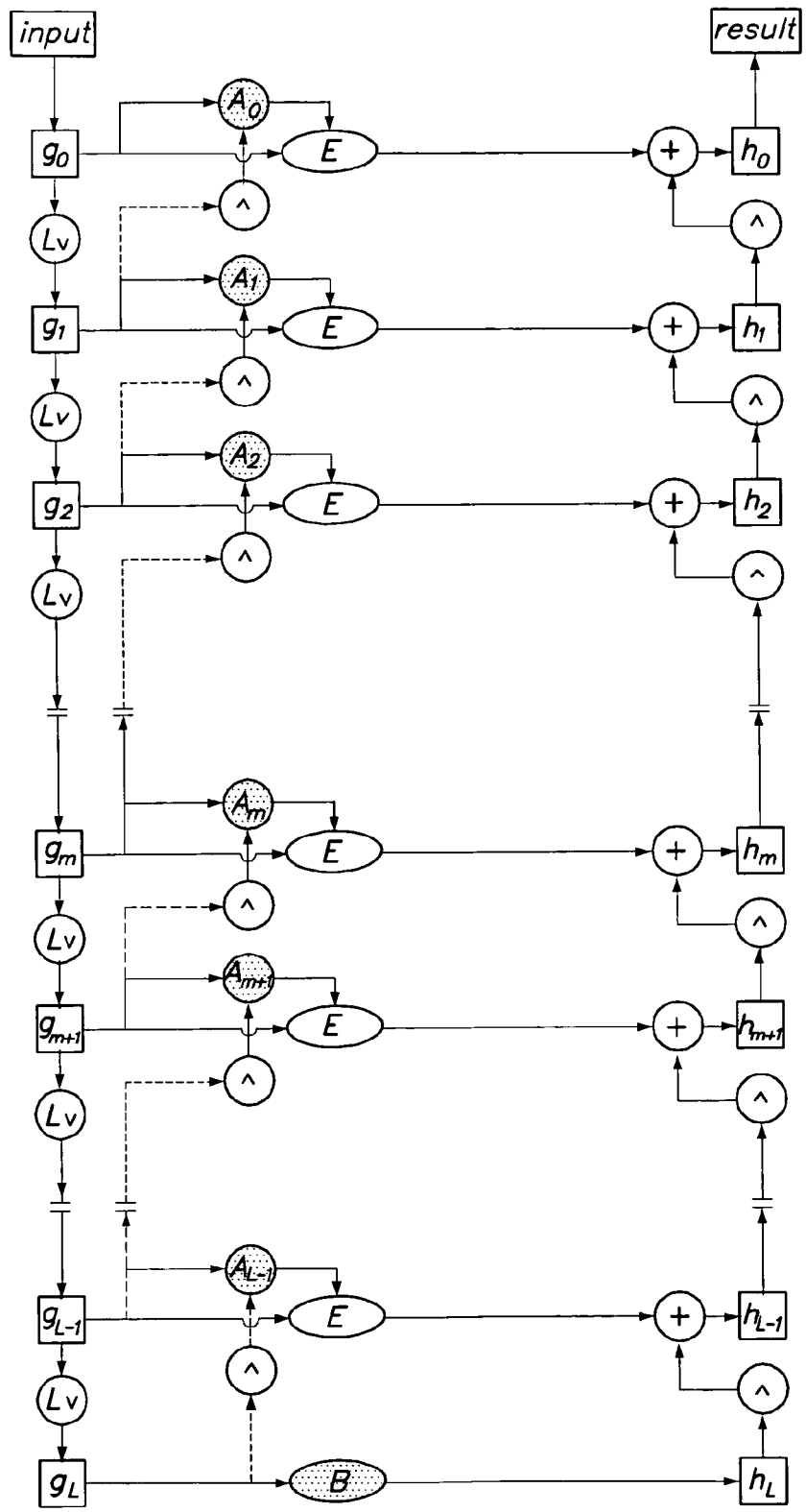
FIG. 1 shows a multi-resolution image processing scheme with two control paths.

The contrast enhancement algorithm of the present invention is applicable to all multi-scale detail representation methods from which the original image can be computed by applying the inverse transformation.

It is applicable to the reversible multi-scale detail representation that can be computed as a weighted sum of translation difference images.

The weighing factors and the translation offsets of the translation difference images can be deducted from the multi-scale is decomposition in such a way that the resulting weighted sum of the translation difference images is identical to the detail pixel values.

For these multi-scale detail representations the contrast can be enhanced by applying the conversion operator to the translation differences before the weighted sum is computed.

To compute the weighted sum of translation difference images, the approximation image at the same scale (or resolution level) or the approximation images at the smaller scales (or finer resolution levels) can be used.

State-of-the-art multi-scale contrast enhancement algorithms decompose an image into a multi-scale representation comprising detail images representing detail at multiple scales and a residual image.

Some of the important multi-scale decompositions are the wavelet decomposition, the Laplacian-of-Gaussians (or LoG decomposition), the Difference-of-Gaussians (or DoG) decomposition and the Burt pyramid.

The wavelet decomposition is computed by applying a cascade of high-pass and low-pass filters followed by a sub-sampling step.

The high-pass filter extracts the detail information out of an approximation image at a specific scale.

In the Burt pyramid decomposition the detail information is extracted out of an approximation image at scale k by subtracting the upsampled version of the approximation image at scale k+1.

In a state of the art methods as the one disclosed in EP 527 525 a contrast enhanced version of the image is created by conversion of the pixel values in the detail images followed by multi-scale reconstruction.

All above implementations of multiscale decomposition have a common property. Each pixel value in the detail images can be computed out of an approximation image by combining the pixel values in a moving neighborhood.

In the above cases the combining function is a weighted sum.

For the wavelet decomposition the pixel values in the detail image at scale k are computed as:

$$d_{k+1} = \downarrow(h_d * g_k)$$

$$g_{k+1} = \downarrow(l_d * g_k)$$

with $h_d$ a high-pass filter, $l_d$ a low-pass filter, * the convolution operator and $\downarrow$ the subsampling operator (i.e. leaving out every second row and column).

For the wavelet reconstruction the enhanced approximation image at scale k is computed as:

$$h_k = l_r * (\uparrow h_{k+1}) + h_r * (\uparrow f(d_{k+1}))$$

with $h_r$ a high-pass filter, $l_r$ a low-pass filter and $\uparrow$ the upsampling operator (i.e. inserting pixels with value 0 in between any two rows and columns).

For the Burt decomposition the pixel values in the detail image at scale k are computed as:

$$d_k = g_k - 4g * (\uparrow g_{k+1})$$

or $$d_k = g_k - 4g * (\uparrow(\downarrow(g * g_k)))$$

or $$d_k = (1 - 4g * (\uparrow(\downarrow g))) * g_k$$

with g a Gaussian low-pass filter and 1 the identity operator.

For the Burt reconstruction the enhanced approximation image at scale k is computed as:

$$h_k = 4g * (\uparrow(\uparrow h_{k+1}) + f(d_k))$$

with f(x) the conversion operator.

The Multi-scale Detail Pixel Values as Weighted Sums

Suppose that in the Burt multi-scale decomposition a 5×5 Gaussian filter is used with coefficients $w_{k,l}$ with k=−2, . . . 2 and l=−2, . . . , 2, the subsampling operator removes every second row and column and the upsampling operator inserts pixels with value 0 in between any two rows and columns.

The pixel at position i,j in the approximation image $g_{k+1}$ is computed as:

$$g_{k+1}(i, j) = \sum_{s=-2}^{2} \sum_{t=-2}^{2} w_{s,t} g_k(2i+s, 2j+t)$$

The pixel at position i,j in the upsampled image $u_k$ is computed as:

$$u_k(i, j) = \begin{cases} \sum_{s=-2}^{2} \sum_{t=-2}^{2} w_{s,t} g_k(i+s, j+t) & \text{if } i \text{ and } j \text{ are even} \\ 0 & \text{otherwise} \end{cases}$$

The pixel at position i,j in the upsampled, smoothed image $gu_k$ is computed as:

$$gu_k(i,j) = \begin{cases} \sum_{m=\{-2,0,2\}} \sum_{n=\{-2,0,2\}} w_{m,n} \sum_{s=-2}^{2} \sum_{t=-2}^{2} w_{s,t} g_k\binom{i+s+m,}{j+t+n} & \text{if } i \text{ and } j \text{ are even} \\ \sum_{m=\{-1,1\}} \sum_{n=\{-2,0,2\}} w_{m,n} \sum_{s=-2}^{2} \sum_{t=-2}^{2} w_{s,t} g_k\binom{i+s+m,}{j+t+n} & \text{if } i \text{ is odd and } j \text{ is even} \\ \sum_{m=\{-2,0,2\}} \sum_{n=\{-1,1\}} w_{m,n} \sum_{s=-2}^{2} \sum_{t=-2}^{2} w_{s,t} g_k\binom{i+s+m,}{j+t+n} & \text{if } i \text{ is even and } j \text{ is odd} \\ \sum_{m=\{-1,1\}} \sum_{n=\{-1,1\}} w_{m,n} \sum_{s=-2}^{2} \sum_{t=-2}^{2} w_{s,t} g_k\binom{i+s+m,}{j+t+n} & \text{if } i \text{ and } j \text{ are odd} \end{cases}$$

Finally, the pixel at position i,j in the detail image $d_k$ is computed as:

$$d_k(i,j) = \begin{cases} g_k(i,j) - 4 \sum_{m=\{-2,0,2\}} \sum_{n=\{-2,0,2\}} w_{m,n} \sum_{s=-2}^{2} \sum_{t=-2}^{2} w_{s,t} g_k\binom{i+s+m,}{j+t+n} & \text{if } i \text{ and } j \text{ are even} \\ g_k(i,j) - 4 \sum_{m=\{-1,1\}} \sum_{n=\{-2,0,2\}} w_{m,n} \sum_{s=-2}^{2} \sum_{t=-2}^{2} w_{s,t} g_k\binom{i+s+m,}{j+t+n} & \text{if } i \text{ is odd and } j \text{ is even} \\ g_k(i,j) - 4 \sum_{m=\{-2,0,2\}} \sum_{n=\{-1,1\}} w_{m,n} \sum_{s=-2}^{2} \sum_{t=-2}^{2} w_{s,t} g_k\binom{i+s+m,}{j+t+n} & \text{if } i \text{ is even and } j \text{ is odd} \\ g_k(i,j) - 4 \sum_{m=\{-1,1\}} \sum_{n=\{-1,1\}} w_{m,n} \sum_{s=-2}^{2} \sum_{t=-2}^{2} w_{s,t} g_k\binom{i+s+m,}{j+t+n} & \text{if } i \text{ and } j \text{ are odd} \end{cases}$$

Generally, the pixel at position i,j in the detail image $d_k$ can be computed as a weighted sum of pixels in the approximation image at the same or smaller scale k, k−1, k−2, ... :

$$d_k(i,j) = g_l(ri, rj) - \sum_m \sum_n v_{m,n} g_l(ri+m, rj+n)$$

with $l \in \{0, \ldots, k\}$ and r=subsampling_factor$^{(1-k)}$
Because $$\sum_m \sum_n v_{m,n} = 1$$

the pixel at position i,j in the detail image $d_k$ can be computed as:

$$d_k(i,j) = g_l(ri, rj) - \sum_m \sum_n v_{m,n} g_l(ri+m, rj+n)$$

$$d_k(i,j) = \sum_m \sum_n v_{m,n} g_l(ri, rj) - \sum_m \sum_n v_{m,n} g_l(ri+m, rj+n)$$

$$d_k(i,j) = c_k(i,j) = \sum_m \sum_n v_{m,n} (g_l(ri, rj) - g_l(ri+m, rj+n))$$

The term $g_l(ri,rj) - g_l(ri+m, rj+n)$ is called a translation difference.

It expresses the difference in pixel value between a central pixel and a neighboring pixel in an approximation image. It is a measure of local contrast.

The weighted sum of the translation differences is called a centre difference $c_k(i,j)$.

In a similar way it can be proven that the detail images in other multi-scale decomposition methods can also be represented as a combination of translation difference images.

The Conversion Operation

In state-of-the-art methods like the one disclosed in EP 527 525 contrast enhancement is obtained by applying a conversion operator f(x) to the detail image $d_k$ or, equivalently:

$$f(d_k(i,j)) = f\left(g_l(ri, rj) - \sum_m \sum_n v_{m,n} g_l(ri+m, rj+n)\right)$$

An example of such a conversion operator is the sigmoid function. Another example of such conversion operator is the contrast enhancement function like the one disclosed in EP 527 525. The shape of the conversion operator depends on the specific requirements of the enhancement which is intended to amplify the low-value detail pixel more than the high-value detail pixels.

The conversion step may cause deformations of the shape of the edge transitions in the reconstructed, contrast enhanced image. The reason is the non-linearity of the conversion function.

Generally, the following applies to non-linear functions:

$$f(x+y) \neq f(x) + f(y)$$

or $$f\left(\sum_i x_i\right) \neq \sum_i f(x_i)$$

State-of-the-art algorithms first compute the pixel values in the detail image $d_k$ as weighted sums and apply the conversion step afterwards.

By rewriting the pixel values in the detail image $d_k$ as a weighted sum of translation differences, it is possible to apply the conversion step before the summation instead of afterwards.

Contrast enhancement is now obtained by applying the conversion step to the translation differences:

$$f(d_k(i,j)) = \sum_m \sum_n v_{m,n} f(g_l(ri, rj) - g_l(ri+m, rj+n))$$

In this way the shape of the edge transitions is better preserved in the contrast enhanced, reconstructed image.

If for every scale k the detail image at that scale is computed out of the full resolution image $g_0$, and enhancement is applied to the center differences, then the shapes of the edge transitions are best preserved after reconstruction.

Figure 2:
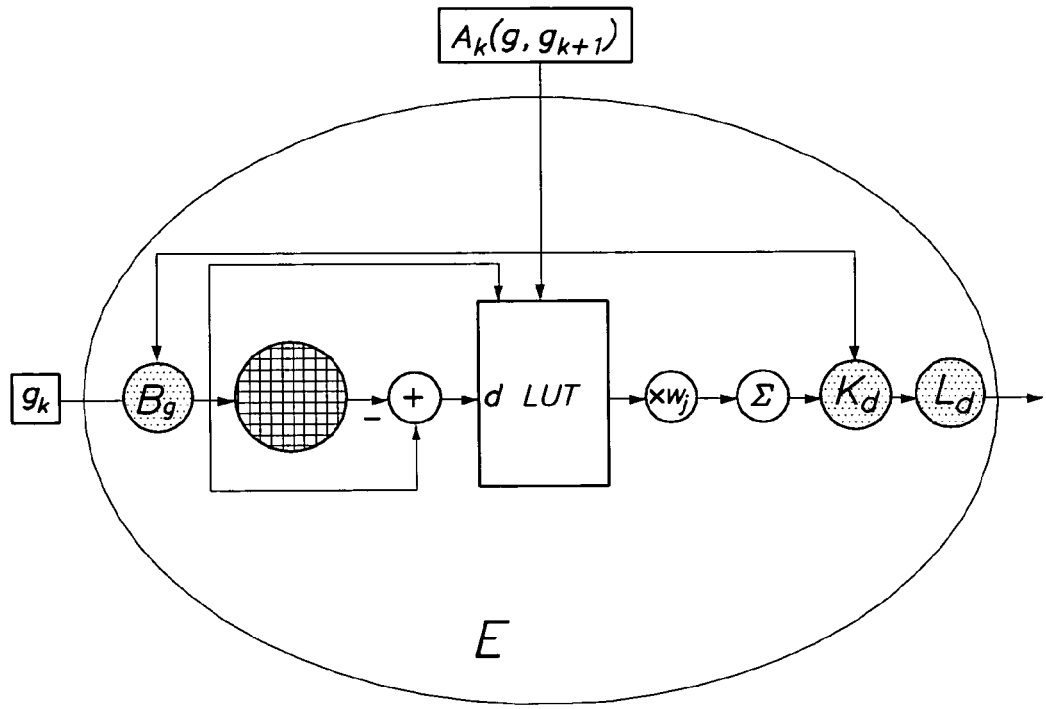
FIG. 2 shows an advanced enhancement functional block.
Figure 3:
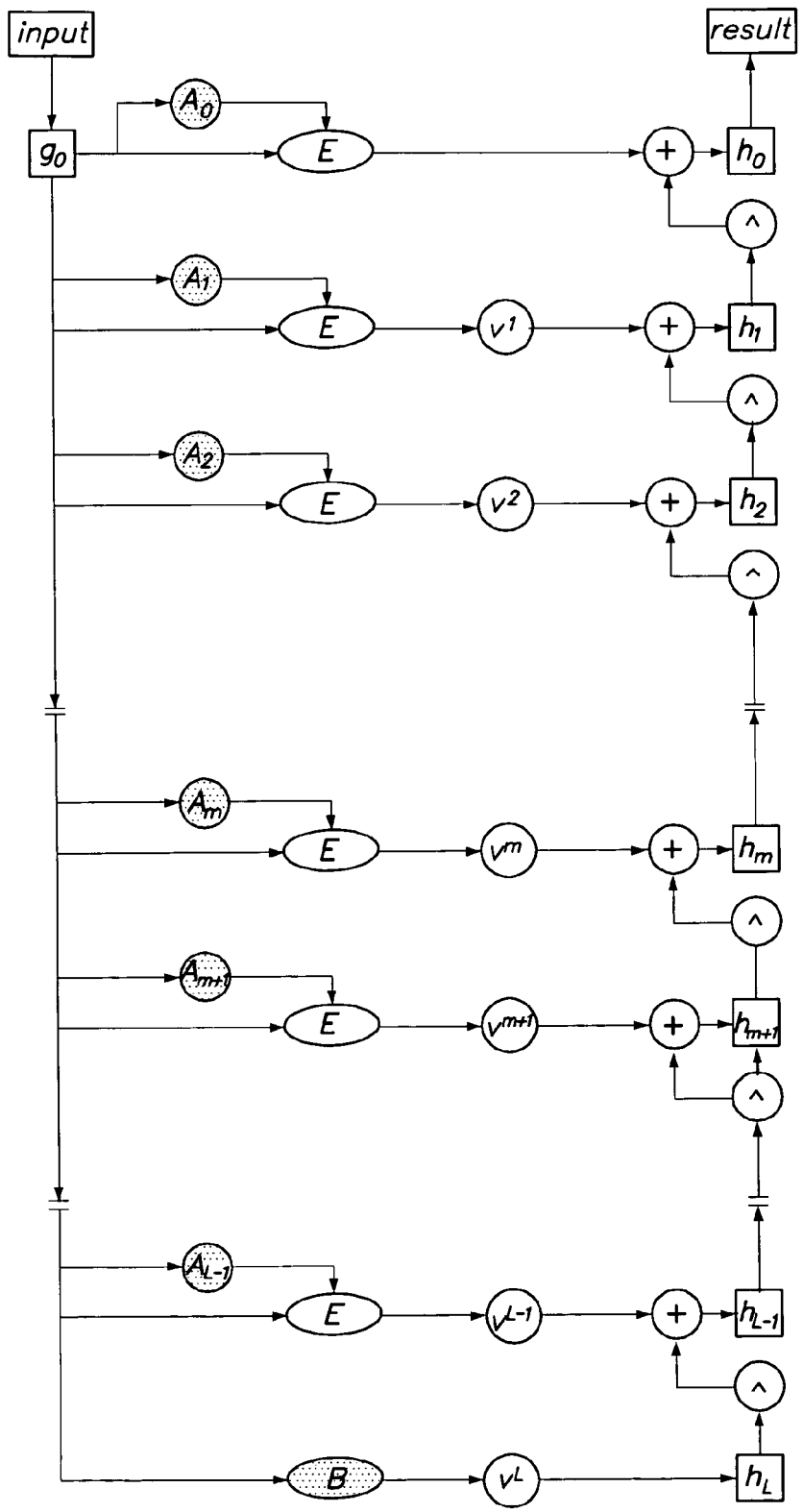
FIGS. 3 and 5 illustrate different implementations of the multi-resolution image processing method according to the present invention.
Figure 4:
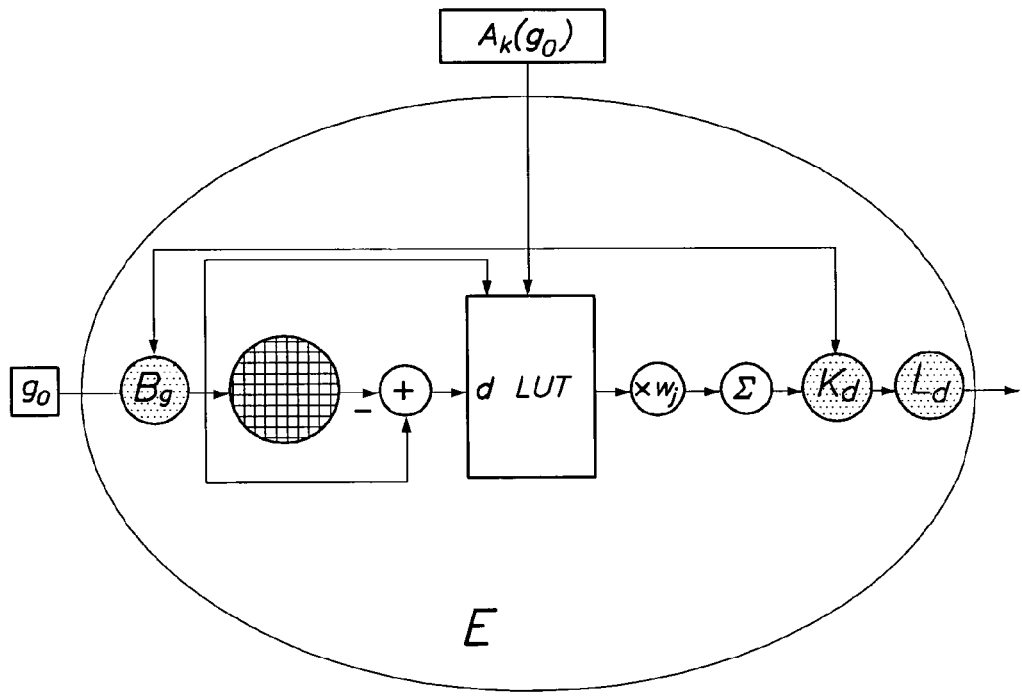
FIG. 4 illustrates the image enhancement step of the multi-resolution image processing method illustrated in FIG. 3.
Figure 5:
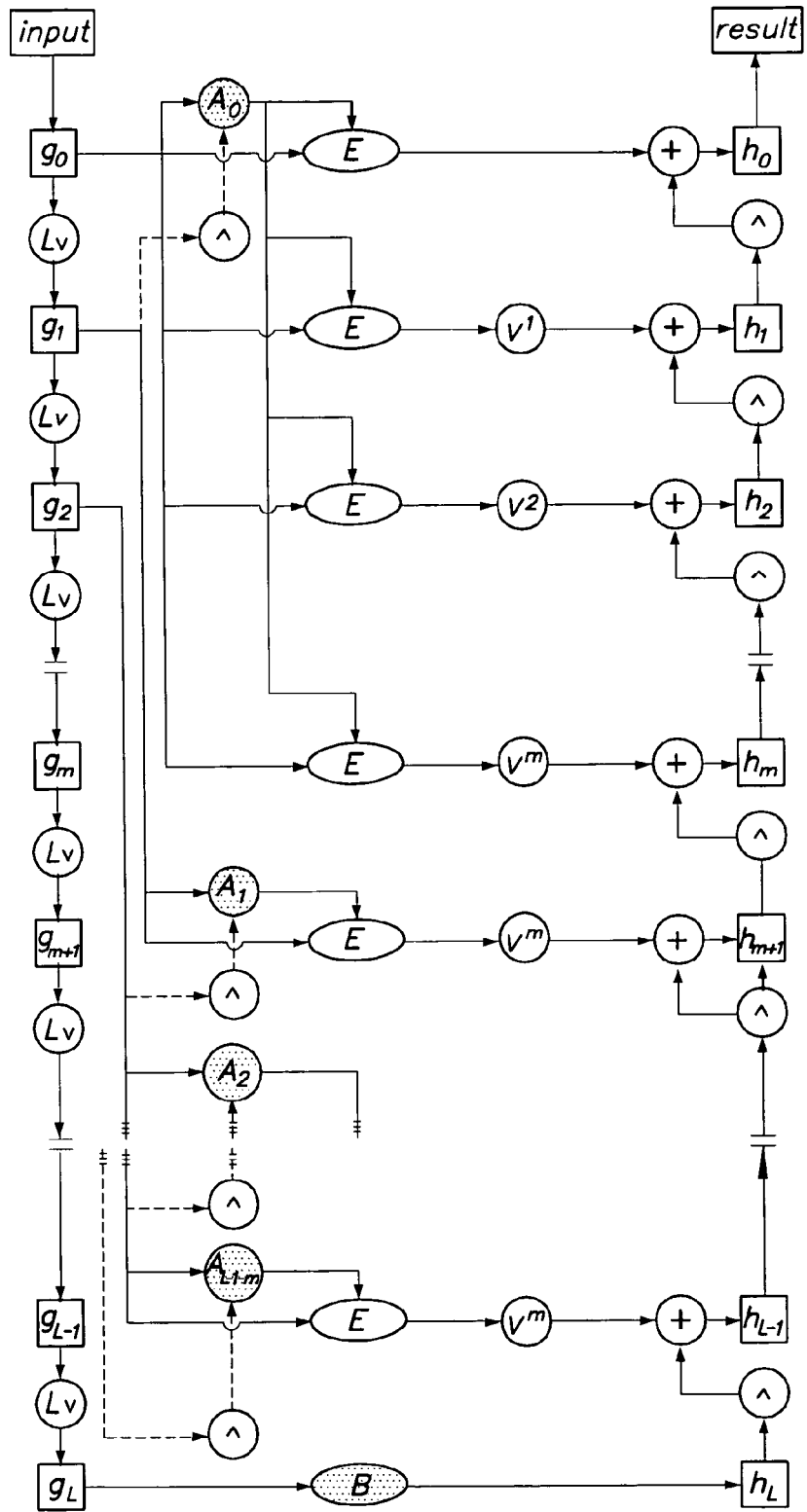
Figure 6:
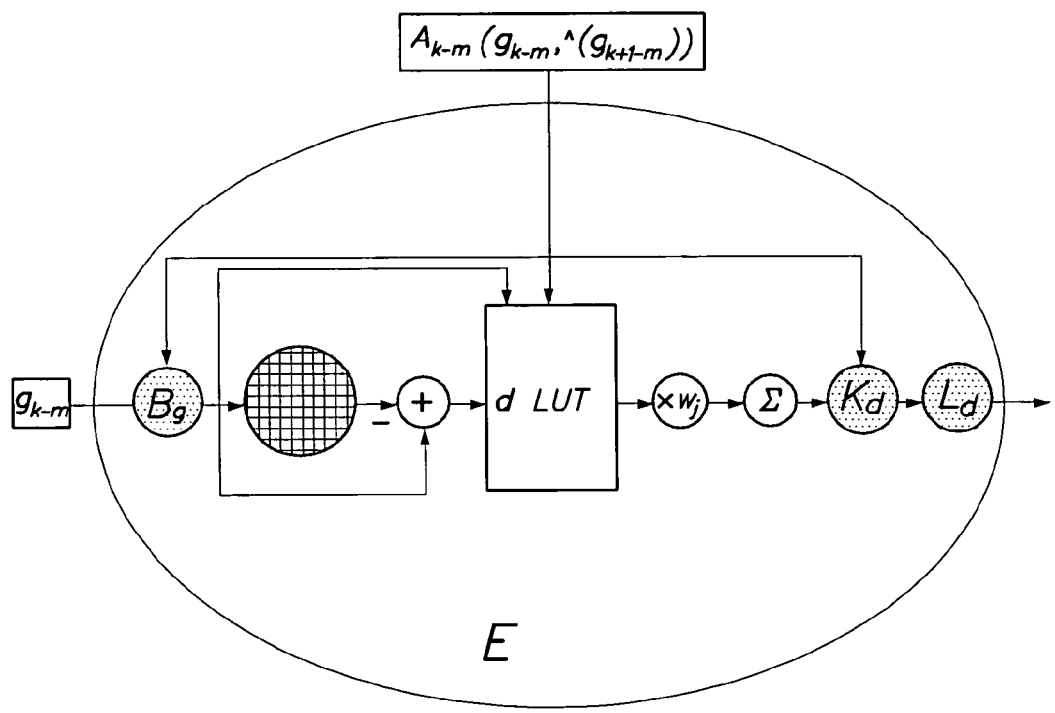
FIG. 6 illustrates the image enhancement step of the multi-resolution image processing method illustrated in FIG. 5.

Different implementations of the present invention are illustrated in FIGS. 1, 3 and 5 with the corresponding enhancement steps being illustrated in FIGS. 2, 4 and 6.

FIG. 1 shows a multi-scale image processing scheme with the center difference images computed out of the approximation images at the same scale. This figure shows an extended scheme for multi-resolution image processing provided with control paths.

Functional Blocks $A_k$

With the functional blocks $A_k$ desired characteristics can be extracted out of the approximation images $g_k$ and/or $g_{k+1}$. These characteristics can be used as control inputs for the LUT operation in the enhancement block E and/or for optional adaptive filtering of the approximation images and/or the enhanced center difference images.

An approximation image can be used as input for determining any useful characteristic (e.g. histogram, filter coefficients, standard deviation image, gradient image, . . . ).

An example of such a characteristic is an averaging filter to compute the average grey value in a specific neighborhood which makes grey value dependent enhancement possible.

Another characteristic can be the local standard deviation which will result in image activity dependent enhancement.

Still another example is the computation of a gradient image out of an approximation image to perform gradient-driven image enhancement for the purpose of noise reduction.

State of the art multi-scale image processing methods can be used to reduce the noise in a digital image by filtering the detail images. A straightforward implementation is local averaging of the detail images so as to reduce differences between detail coefficients that are due to noise.

However, these straightforward methods are not satisfactory with respect to reducing the noise in the image while retaining the edges, e.g. small details with low contrast can become even less visible.

Better results can be achieved by adaptive filtering (e.g. weighted averaging) of the enhanced center difference images steered by the local gradient. The steering block $A_k$ can thus be used to compute gradient images out of approximation images.

Functional Block B

The functional block B is used to enhance the residual image $g_L$. This block applies an optional transform to the residual image to generate the enhanced approximation image $h_L$ at scale L.

An example of such a transform is a gain adjustment to limit the dynamic range. The residual approximation image is used as input, the output is an enhanced residual image.

The pixel value range of an input image may be too large to display all image regions with sufficient contrast resolution. Reducing the relative contribution of the very low frequency components in the image with respect to the high and medium frequency components will improve the contrast of all relevant image features.

FIG. 2 is a detailed view of the enhancement functional block used in the method illustrated in FIG. 1.

Functional Block LUT

This transformation block is used to create an enhanced version of the center difference images by modifying the translation differences d.

As control input a combination can be used of:

$A_{k-m}(g_{k-m}, \uparrow(g_{k+1-m}))$ $B_g(g_{k-m})$ $C_k(d_{k-m}, \uparrow(d_{k+1-m}))$ The LUT operator can be implemented as a n-dimensional look up table or as an analytic function or as an adaptive filter or as any combination of the previous ones.

Input: (optionally filtered) translation differences.

Optional inputs:

$A_{k-m}(g_{k-m}, \uparrow(g_{k+1-m)})$ $B_g(g_{k-m})$ $C_{k-m}(d_{k-m}, \uparrow(d_{k+1-m}))$ Output: enhanced translation differences.

Application:

Visualization of a digital image is generally improved by amplifying the contrast of subtle image features, and at the same time attenuating the strong components without the risk of omitting information.

This contrast equalization is done by generating enhanced multi-scale center difference images.

For this enhancement, the LUT operator is used to generate enhanced translation differences and these are combined to create enhanced center difference images.

The degree of enhancement can be steered by any characteristic derived from the approximation images or detail images.

By using the filtered grey value approximation image itself $B_g(g_{k-m})$, a grey-value dependent enhancement can be applied. For example, it can be useful to enhance the subtle contrasts more in the brighter image regions than the ones in the dark regions (e.g. to make the fine image structures of a mammographic image more visible within the fibroglandular tissue).

A first optional step is the adaptive filtering of the approximation image $g_{k-m}$. The adaptation components can be formed by $A_k(g_{k-m}, \uparrow(g_{k+1-m}))$.

The grey values of the approximation image $g_k$ can be used directly as control input for the LUT component.

Also the steering component $A_k(g_{k-m}, \uparrow(g_{k+1-m}))$ can be used as additional control inputs for the LUT.

Adaptive Filter $K_d$

The functional block $K_d$ is an optional adaptive or non-adaptive filtering of the enhanced center difference images.

This adaptive filter can be based on the characteristics of the approximation images at the same scale and/or coarser scale $A_k(g_{k-m}, \uparrow(g_{k+1-m}))$ and/or on the characteristics of the detail images at the same scale and/or coarser scale $C_k(d_{k-m}, \uparrow(d_{k+1-m}))$.

An example is adaptive smoothing of the enhanced center difference image where the steering input $A_k(g_{k-m}, \uparrow(g_{k+1-m}))$ is e.g. a gradient image of the approximation image at the coarser scale.

Input: enhanced center difference image.
Optional inputs:
  characteristics of the approximation image at the scale k−m and/or scale k+1−m
    (with m=0 $\Rightarrow$ multi-scale processing scheme in FIG. 1; with m> number of scales −1 $\Rightarrow$ multi-scale processing scheme in FIG. 3; for intermediate values see FIG. 5)
  characteristics of the detail image at the scale k−m and/or scale k+1−m
    (with m=0 $\Rightarrow$ multi-scale processing scheme in FIG. 1, with m> number of scales −1 $\Rightarrow$ multi-scale processing scheme in FIG. 1).
Output: filtered enhanced center difference image.
Application: It is one of the most apparent merits of digital image processing, that contrast can be raised to any feasible level. However, noise is amplified to the same extent. For that reason secondary control mechanisms are preferably introduced to reduce the amount of contrast enhancement in areas where strong contrast enhancement is undesirable.
For this purpose the enhanced center difference images can be smoothed in a direction perpendicular to the local gradient (derived from the approximation images $A_k(g_{k-m}, \uparrow(g_{k+1-m}))$). This reduces the noise in the resulting image while retaining and even enhancing the edges in the result image.

Optional Transformation Block $L_d$
The functional block $L_d$ applies an optional pixel-wise transform to the enhanced center difference images.
Input: enhanced center difference image.
Output: transformed, enhanced center difference image.
Application:
In case an overall increase of the sharpness of the resulting image is preferred, this can be achieved by amplification of the finest, enhanced center difference images.
Another example of such an optional transform is the normalization of the amplitudes of the enhanced center difference images.

The Functional Block $B_g$
The functional block $B_g$ is an optional adaptive or non-adaptive filtering of the approximation images at each scale before the center difference images are computed.
The adaptive filter can be based on the characteristics of the approximation images at the same scale and/or coarser scale $A_k(g_k, \uparrow(g_{k+1}))$ and/or on the characteristics of the detail images at the same scale and/or coarser scale $C_k(d_k, \uparrow(d_{k+1}))$.
Input: approximation image.
Optional inputs are
characteristics of the approximation image at the scale k−m or scale k+1−m
  (with m=0 $\Rightarrow$ multi-scale processing scheme in FIG. 1; with m> number of scales −1 $\Rightarrow$ multi-scale processing scheme in FIG. 3; for intermediate values see FIG. 5).
characteristics of the detail image at the scale k−m and/or scale k+1−m
  (with m=0 $\Rightarrow$ multi-scale processing scheme in FIG. 1, with m>number of scales −1 $\Rightarrow$ multi-scale processing scheme in FIG. 1).
Output: filtered approximation image.
This embodiment can be used as an anti-aliasing measure.
Aliasing is a common problem with the conventional image enhancement processes. Aliasing is produced by the downsampling and upsampling is of the approximation images.
If the detail images are not modified, these aliasing effects are cancelled out in the reconstruction process. However, if the adaptive filtering and the LUT conversion are applied to the detail images, there is no proper cancellation of the aliasing effects in the reconstruction process. This will generate artifacts in the enhanced digital image.
The appearance of these aliasing artifacts is reduced by computing the enhanced center difference images instead of the direct enhancement of the detail images.
However, even better image enhancement results can be achieved by pre-filtering the approximation images $g_k$ before computing the translation differences.
In the embodiments shown in FIGS. 1 and 2 there are no control paths using the detail coefficients because the detail images as such are not computed. Similar characteristics can be derived from the approximation images.
The adaptive filters $K_d$ and $B_g$ could also be controlled by the detail images.
FIG. 3 shows a similar extended scheme for multi-resolution image processing as FIG. 1, the difference being that all the enhanced translation difference images are computed out of the original, full resolution image instead of the different approximation images.
Similar control paths are shown.
The repeated subsampling blocks $v^m$ can be incorporated in the enhancement block E for reason of computation efficiency. $v^m$ means that the input image of this block is subsampled m times.
FIG. 4 is similar to FIG. 2 with control path $A_k(g_0)$.
FIG. 5 and FIG. 6 show the hybrid implementation which is a combination of the multi-scale image processing schemes showed in FIG. 1 and FIG. 3.
The drawings include subsampling to create pyramidal multi-scale decompositions. Subsampling may be omitted to create funnel-like decompositions.
In the description the indices of $A_k$ and $C_k$ corresponds with the scale of the used approximation and detail images (scale k and k+1) except in the full resolution multi-scale image processing scheme of FIG. 3. In this last scheme the images at scale 0 are used.

The invention claimed is:
1. A method of enhancing the contrast of a detail image that is represented by a digital signal, the method comprising:
  at least one approximation image is created at one or multiple scales, an approximation image at a scale representing the grey values of said detail image in which all details at that scale have been omitted,
  translation difference images are created by pixel-wise subtracting the values of an approximation image at a scale and the values of a translated version of said approximation image,
  a non-linear modification is applied to the values of said translation difference images to generate modified translation difference images,
  at least one enhanced center difference image at a specific scale is computed by combining said modified translation difference images at that scale or a smaller scale with weights, said weights being selected in accordance with an image decomposition algorithm such that, if the enhancement by non-linear modification is not performed, an equivalent of the multi-scale decomposition of said image would be obtained in which the at least one center difference image would be equal to the detail image at the specific scale, an enhanced image is computed by applying a reconstruction algorithm to the enhanced center difference image, wherein at least one of the following actions is performed: (1) said non-linear modification of the values of said translation difference images is steered by a characteristic computed out of said approximation image at at least one scale, (2) said approximation image at a scale is filtered to generate a filtered approximation image, (3) said enhanced center difference image is filtered.

2. A method according to claim 1 wherein said characteristic is the average grey value in a predefined image area.

3. A method according to claim 1 wherein said characteristic is the local standard deviation.

4. A method according to claim 1 wherein said characteristic is the presence of predefined image structures or abnormal patterns in said approximation image.

5. A method according to claim 1 wherein said filtering of said approximation images at a scale is based on the characteristics of approximation images at said scale or a coarser scale.

6. A method according to claim 1 wherein said filtering of said approximation images is based on the characteristics of detail images at said scale or a coarser scale.

7. A method according to claim 1 wherein a pixel-wise transformation or filtering is applied to the residual image being the approximation image at the lowest scale.

8. A method according to claim 1 wherein said filtering of said enhanced center difference images is based on the characteristics of said approximation images at the same or a coarser scale.

9. A method according to claim 1 wherein said filtering of said enhanced center difference images is steered by the characteristics of said detail image at the same or a coarser scale.

10. A method according to claim 1 wherein said filtering of said enhanced center difference images is adaptive smoothing obtained by steering said filtering by means of a gradient image of an approximation image at said scale or a coarser scale.

11. A method according to claim 1 wherein said enhanced center difference images are subjected to a pixel-wise transformation.

12. A method according to claim 11 wherein said transformation is a normalization of the amplitudes of said enhanced center difference images.

13. A method according to claim 1 wherein a translation difference image at a specific scale is computed out of an approximation image at the same scale.

14. A method according to claim 1 modified in that all of said translation difference images are computed out of the original image.

15. A method according to claim 1 wherein a translation difference image at a scale k is computed out of an approximation image at scale m, wherein m represents a scale between scale 1 and scale k−1.

16. A method according to claim 1 wherein the center difference images are identical to the multi-scale detail images.

17. A method according to claim 1 wherein said image is a mammographic image.

18. A method according to claim 1 wherein said image is a computed tomography image.

19. A computer program product embodied on a non-transitory computer-readable medium adapted to carry out a method of enhancing the contrast of a detail image that is represented by a digital signal when run on a computer, the method comprising:

creating at least one approximation image one or multiple scales, an approximation image at a scale representing the grey values of said detail image in which all details at that scale have been omitted, creating translation difference images by pixel-wise subtracting the values of an approximation image at a scale and the values of a translated version of said approximation image, applying a non-linear modification to the values of said translation difference images to generate modified translation difference images, computing at least one enhanced center difference image at a specific scale by combining said modified translation difference images at that scale or a smaller scale with weights,: said weights being selected in accordance with an image decomposition algorithm such that, if the enhancement by non-linear modification is not performed, an equivalent of the multi-scale decomposition of said image would be obtained in which the at least one center difference image would be equal to the detail image at the specific scale, and computing an enhanced image by applying a reconstruction algorithm to the enhanced center difference image, wherein at least one of the following actions is performed: (1) said non-linear modification of the values of said translation difference images is steered by a characteristic computed out of said approximation image at at least one scale, (2) said approximation image at a scale is filtered to generate a filtered approximation image, (3) said enhanced center difference image is filtered.

20. A non-transitory computer readable medium comprising computer executable program code adapted to carry out a method of enhancing the contrast of a detail image that is represented by a digital signal, the method comprising:

creating at least one approximation image one or multiple scales, an approximation image at a scale representing the grey values of said detail image in which all details at that scale have been omitted, creating translation difference images by pixel-wise subtracting the values of an approximation image at a scale and the values of a translated version of said approximation image, applying a non-linear modification to the values of said translation difference images to generate modified translation difference images, computing at least one enhanced center difference image at a specific scale by combining said modified translation difference images at that scale or a smaller scale with weights,: said weights being selected in accordance with an image decomposition algorithm such that, if the enhancement by non-linear modification is not performed, an equivalent of the multi-scale decomposition of said image would be obtained in which the at least one center difference image would be equal to the detail image at the specific scale, and computing an enhanced image by applying a reconstruction algorithm to the enhanced center difference image, wherein at least one of the following actions is performed: (1) said non-linear modification of the values of said translation difference images is steered by a characteristic computed out of said approximation image at at least one scale, (2) said approximation image at a scale is filtered to generate a filtered approximation image, (3) said enhanced center difference image is filtered.

* * * * *